United States Patent
Gotoh

[11] Patent Number: 5,245,241
[45] Date of Patent: Sep. 14, 1993

[54] BRUSH HOLDER IN AC GENERATOR FOR VEHICLES

[75] Inventor: Hitoshi Gotoh, Hyogo, Japan

[73] Assignee: Mitsubishi Denki K.K., Tokyo, Japan

[21] Appl. No.: 765,232

[22] Filed: Sep. 25, 1991

[30] Foreign Application Priority Data

Sep. 27, 1990 [JP] Japan .................... 2-260191

[51] Int. Cl.⁵ ...................... H01R 39/38; H02K 13/00
[52] U.S. Cl. ..................................... 310/242; 310/239
[58] Field of Search ................ 310/42, 239, 242, 247, 310/248, 249, 251, 71, 88

[56] References Cited

U.S. PATENT DOCUMENTS

| | | | |
|---|---|---|---|
| 3,445,705 | 5/1969 | Fuller et al. | 310/247 |
| 3,558,949 | 1/1971 | Evans | 310/239 |
| 4,554,476 | 11/1985 | Gotoh | 310/239 |
| 4,851,730 | 7/1989 | Fushiya et al. | 310/249 |
| 4,876,475 | 10/1989 | Smith | 310/239 |

FOREIGN PATENT DOCUMENTS

| | | |
|---|---|---|
| 125834 | 2/1984 | European Pat. Off. |
| 199504 | 10/1986 | European Pat. Off. |
| 1188712 | 3/1965 | Fed. Rep. of Germany ...... 310/247 |
| 1928513 | 2/1970 | Fed. Rep. of Germany . |

OTHER PUBLICATIONS

German Search Report & Office Action (translation), 4 pages, Feb. 27, 1992.
Rudolph Wessel, Der Elektromeister, 1968, S. 59–62.

*Primary Examiner*—Steven L. Stephan
*Assistant Examiner*—Ed To
*Attorney, Agent, or Firm*—Sughrue, Mion, Zinn, Macpeak & Seas

[57] ABSTRACT

A brush unit having a brush, a lead extending from the brush, a metal terminal plate connected to the lead, and a compression spring interposed between the brush and the metal terminal plate. The brush unit is assembled in advance of mounting the brush unit within a blush box. Thereafter, the brush unit is inserted into and held by the brush box through a solder connection between the metal terminal plate and an electrode portion projecting from the brush box. Accordingly, the brush can be easily assembled within the brush box.

5 Claims, 3 Drawing Sheets

BRUSH HOLDER IN AC GENERATOR FOR VEHICLES

BACKGROUND OF THE INVENTION

The present invention relates to a brush holder provided in an AC generator for use in vehicles, in which a brush is inserted into a brush box and depressed by a compression spring.

FIG. 6 shows a cross sectional view of an AC generator for vehicles, which includes a brush holder mounted thereon. In FIG. 6, a stator 1 has a stator iron core 2 and a stator coil 3. On the other hand, a rotor 4 has pole iron cores 5 and 6, having different polarities, which are arranged so that respective pole teeth portions thereof extend alternately in the axial direction of thereof, an exciting coil 7 fixed between the two pole iron cores 5 and 6, a rotary shaft 8 onto which the two iron cores 5 and 6 are fixed, a pair of slip rings 9 fixed to the rotary shaft 8, and fans 10 and 11 fixed to the pole iron cores 5 and 6, respectively.

The stator iron core 2 is fixed to front and rear brackets 12 and 13 by means of a clamp bolt 14. The rotary shaft 8 is supported by bearings 15 and 16 provided in the front and rear brackets 12 and 13, respectively. A pulley 17 is fixed to the rotary shaft 8 so as to transmit the rotation of an engine to the rotary shaft 8 to thereby rotate the rotor 4.

A rectifier device 18 rectifies, into a direct current, an alternating current generated from an alternating voltage induced by the stator coil 3. A voltage regulator 19 detects a generator voltage and controls an exciting current to regulate a terminal voltage to a predetermined value.

A brush holder 20 is fixed to the rear bracket 13. A brush 28 is held and depressed by the brush holder 20 so as to allow its upward and downward movement. A partition ring 22 is fixed to the rear bracket 13 so as to sealingly surround the slip rings 9 to prevent harmful substances such as moisture and salinity in the ambient air from damaging the slip rings 9.

FIGS. 5A and 5B respectively show a plane view and a partially sectioned frontal view, each showing a conventional brush holder to be mounted onto the above-noted AC generator. The brush holder 20 includes a brush box 21 made of synthetic resin, into which the brush 28 is inserted, a connector portion 23, a terminal portion 24, a compression spring 25 for depressing the brush 28, an electrode portion 26 which is a tip end portion of a connection conductor embedded in the brush box 21, and a cover 27 made of synthetic resin.

A connection lead 29 extending from the brush 28 is pulled out from the brush box 21 through a hole formed in an upper wall of the brush box 21 so that the tip end of the connection lead 29 is wound onto the electrode portion 26 and soldered thereto.

The conventional brush holder for an AC generator used in vehicles, however, suffers from a problem in that mounting of the brush 28 onto the brush holder 20 is difficult since the mounting must be performed by inserting the brush 28 into the brush box 21 in a direction indicated by an arrow A in FIG. 5B, pulling out the tip end of the lead 29 upwardly from the brush box 21, winding the tip end onto the electrode portion 26, and soldering the tip end onto the electrode portion 26. Further, since the tip end of the lead 29 is wound and soldered onto the electrode portion 26, if the soldered portion of the lead 29 is excessive in length, the other free portion of the lead 29 becomes shortened. As a result, the brush 28 is pulled by the lead 29 and the movement of the brush 28 is restricted, due to the shortened length of the lead 29, before the brush 28 reaches its abrasion limit of the brush 28.

Furthermore, when the brush is changed because of wear, it is necessary that the tip end of the lead 29 of the brush 28 be unsoldered, the brush removed from the brush box 21 downwardly, the other new brush 28 inserted into the brush box 21 upwardly, a tip end of a lead 29 of the other new brush 28 pulled out from the brush box 21, and wound and soldered onto the electrode portion 27. Accordingly, changing a brush 28 requires much time and special skill.

SUMMARY OF THE INVENTION

The present invention was made in order to solve the above-mentioned problems. Accordingly, it is an object of the present invention to provide a brush holder provided in an AC generator for use in vehicles, in which a brush can be easily assembled in a brush box without special skill and in which the replacement of the brush can be easily performed.

In order to attain the above-noted and other objects, the present invention provides a brush holder provided in an AC generator adapted for use in vehicles, having a brush unit including a brush, a lead connected at its one end with the brush, a metal terminal plate onto which the other end of the lead is welded and connected, and a compression spring interposed between the brush and the metal terminal plate. A brush box accommodates the brush unit therein; and an electrode portion of a connection conductor, projects from an upper end portion of the brush box and soldered to the metal terminal plate so that the brush unit is accommodated in the brush box and the metal terminal plate abuts the upper end portion of the brush box.

The brush unit may include a first hole formed in the metal terminal plate, through which the other end of the lead passes from a first side of the metal terminal plate to a second side thereof, and a projection formed on the second side of the metal terminal plate near the first hole, onto which the other end of the lead is welded.

Further, the brush unit may include a second hole formed in the metal terminal plate, through which the electrode portion passes from a first side of the metal terminal plate to a second side thereof when the metal terminal plate abuts the upper end portion of the brush box.

The brush holder may further have means for sealing the brush box having the brush unit therein.

The present invention further provides a method for holding a brush within a brush holder provided in an AC generator adapted for use in vehicles, comprising the steps of:

(a) inserting a connection lead of a brush into an inside a compression coiled spring;

(b) welding a tip end of the connection lead onto a metal terminal plate;

(c) after the steps of (a) and (b), inserting the brush into a brush box made of synthetic resins until the metal terminal plate abuts against an upper end portion of the brush box; and (d) soldering an electrode portion projected from the upper end portion of the brush box onto the metal terminal plate, to thereby electrically connect the brush with the electrode portion and hold the brush within the brush box.

According to the present invention, since the end of the connection lead of the brush is previously welded to the metal terminal plate, the length of the connection lead between the top of the brush and the metal terminal plate can be accurately set at a desired length. Further, since the brush is held within the brush box by simply inserting the brush unit into the brush box and soldering the electrode portion onto the metal terminal plate the mounting of the brush in the brush box can be easily performed and, the brush can be replaced efficiently.

DETAILED DESCRIPTION OF THE PREFERRED EMBODIMENTS

Preferred embodiments of the present invention will now be described in detail with reference to the accompanying drawings attached hereto.

Figure 1:
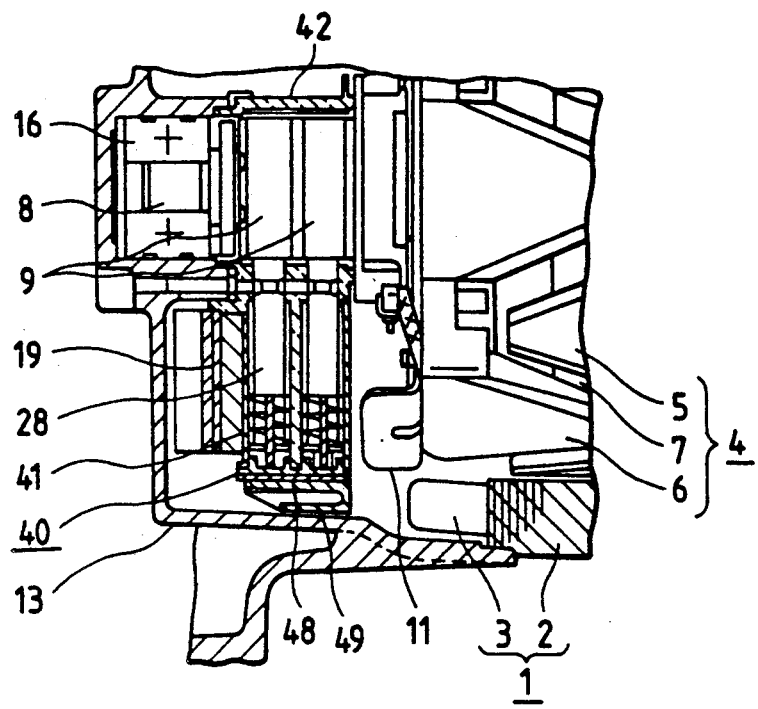
FIG. 1 is a cross-sectional view of a major part of an AC generator for vehicles, in which a brush holder according to an embodiment of the present invention is mounted thereon.
Figure 6:
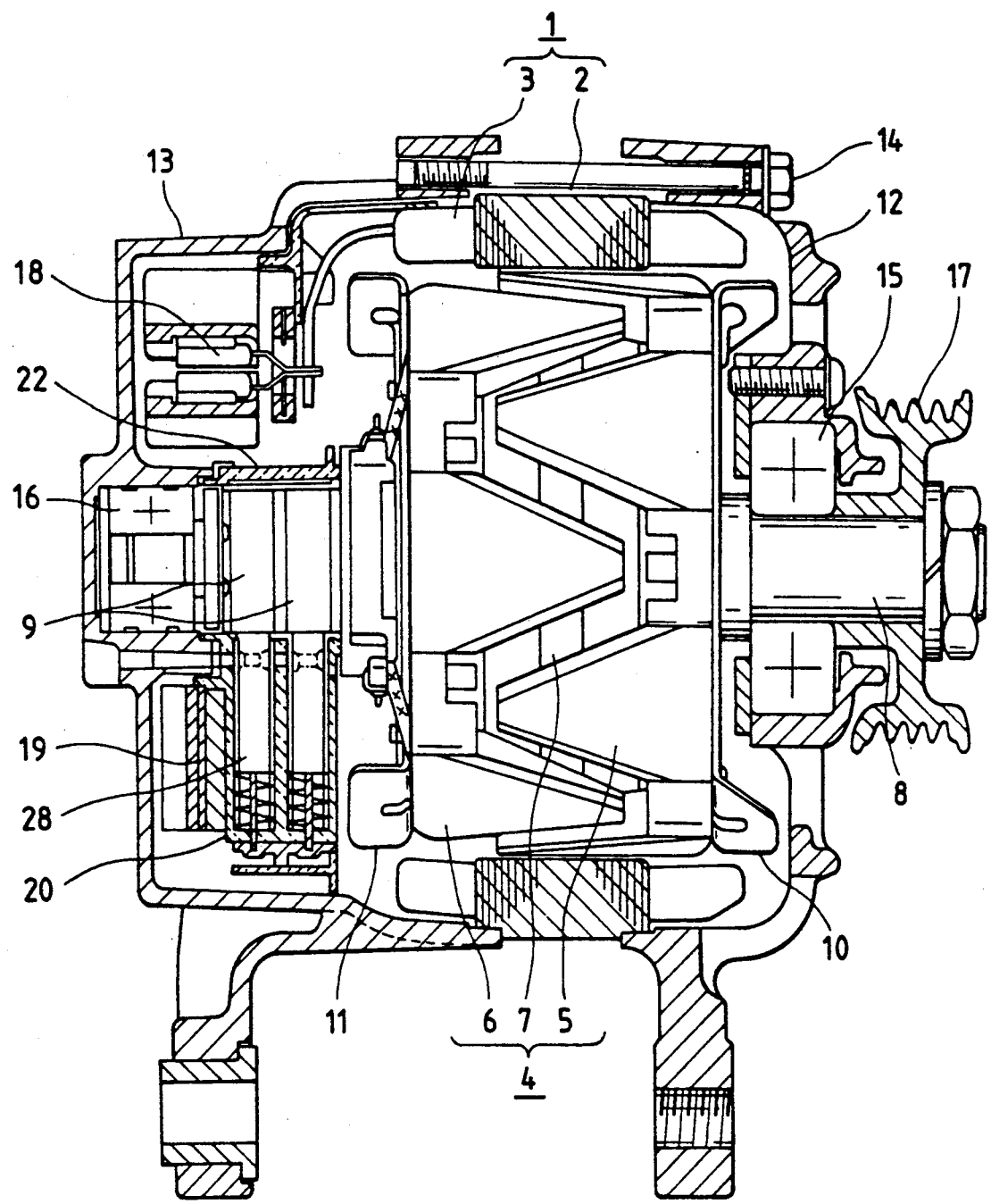
FIG. 6 is a longitudinally sectional view showing an AC generator for vehicles, in which the brush holder shown in FIGS. 5A and 5B is mounted thereon.

FIG. 1 shows a brush holder according to an embodiment of the present invention, in a state that the brush holder is mounted onto an AC generator for use in vehicles. In this figure, reference characters 1-9, 11, 13, 16, 19 and 28 designate the same parts as in the above-mentioned AC generator shown in FIGS. 6, and thus the detailed description thereof is omitted here.

A brush holder 40 is fixed to a rear bracket 15. The brush 28 is held and depressed by the brush holder 40 to be movable in an upward and downward direction in FIG. 1. A partition ring 42 is integrally formed on a blush box 41. The partition ring 42 sealingly circumscribes around the slip rings 9 with a gap therebetween.

Figure 2A:
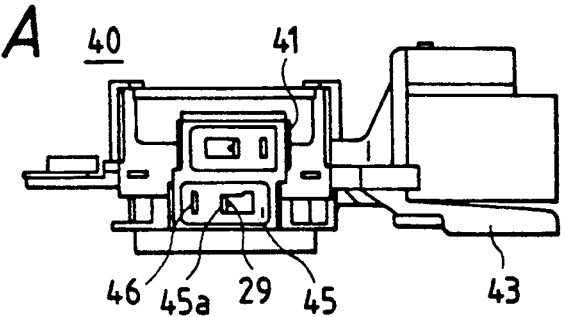
FIGS. 2A and 2B respectively are a plane view and a partially sectional frontal view, each showing the brush holder shown in FIG. 1.
Figure 2B:
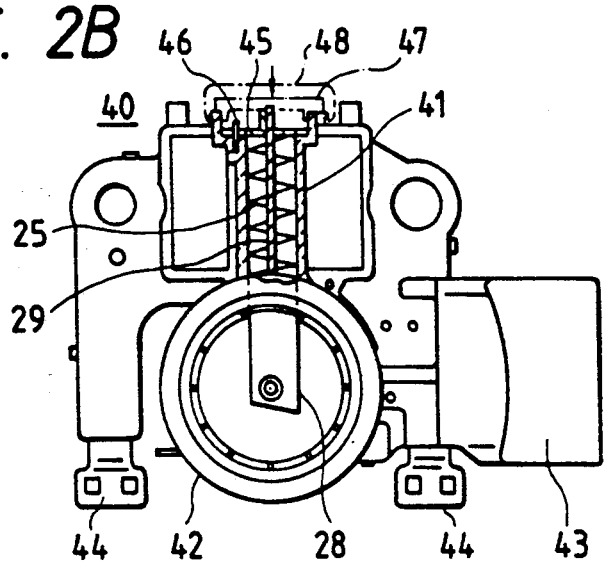

In the brush holder 40 shown in detail in FIGS. 2A and 2B, the brush box 41 and the partition ring 42 are integrally formed with each other as a one piece member made of synthetic resins. A connector portion 43 and terminal portions 44 are provided on the brush holder 40. An electrode portion 46 is embedded in the brush box 41 so that the tip end thereof projects from an upper end of the brush box 41.

Figure 3:
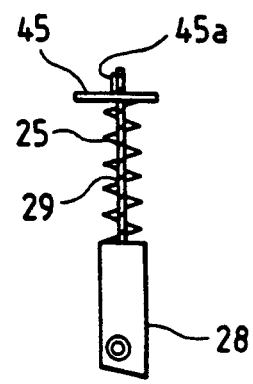
FIG. 3 is a front view showing a brush portion shown in FIGS. 2A and 2B.

As shown in FIG. 3, a metal terminal plate 45 is provided with a projection 45a. The brush 28 is connected to the terminal plate 45 in advance of inserting the brush 28 into the brush box 41 such that a connection lead extending from the brush 28 is inserted into a compression spring 25, a tip end of the lead 29 is inserted into the metal terminal plate 45, and the tip end is connected to the projection 45a by welding. Accordingly, the length of the lead 29 between the upper end of the brush 28 and the metal terminal plate 45 can be accurately set at a predetermined value. Thus, it is possible to prevent problems caused by shortened leads in conventional brush holders.

Returning to FIGS. 2A and 2B, the brush 28 having a metal terminal plate 45 connected to the tip end of the lead 29 of the brush 28 and a compression spring 25 interposed between the brush 28 and the metal terminal plate 45, is inserted into the brush box 41 downwardly as shown by an arrow in FIG. 2B until the metal terminal plate 45 abuts against the upper end of the brush box 41. In this state, the metal terminal plate 45 is soldered to the electrode portion 46 which projects from the metal terminal plate 45 through a hole formed on the terminal plate 45 so as to be fixed to the brush box 41, thereby achieving an electrical connection between the brush 28 and the electrode portion 46 and securing the brush 28 to the brush box 41. In addition, a rubber cap 47 is fitted onto the upper portion of the brush box 41 for protection. A cover 48 made of synthetic resin is fitted over the rubber cap 47.

Figure 4:
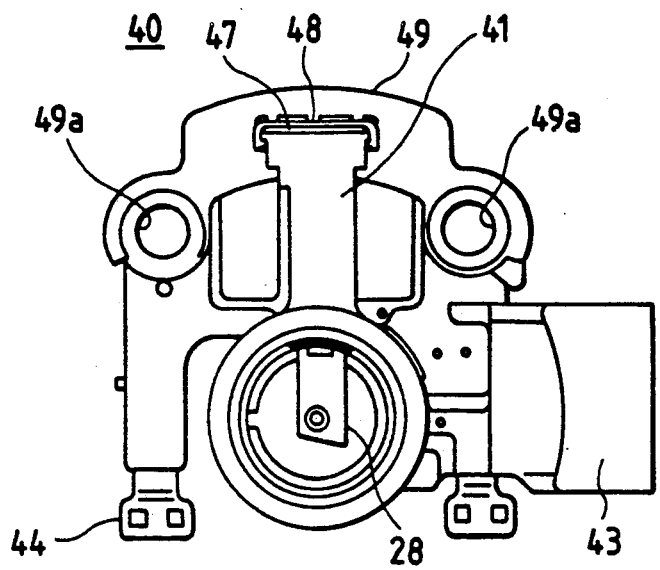
FIG. 4 is a front view showing the brush holder in a state that a guide cover is arranged onto the brush holder.
Figure 5A:
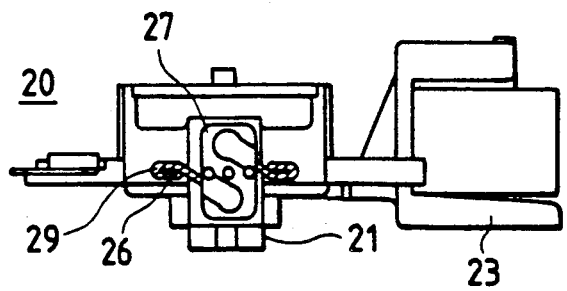
FIGS. 5A and 5B respectively are a plane view and a partially sectioned frontal view, each showing a conventional brush holder.
Figure 5B:
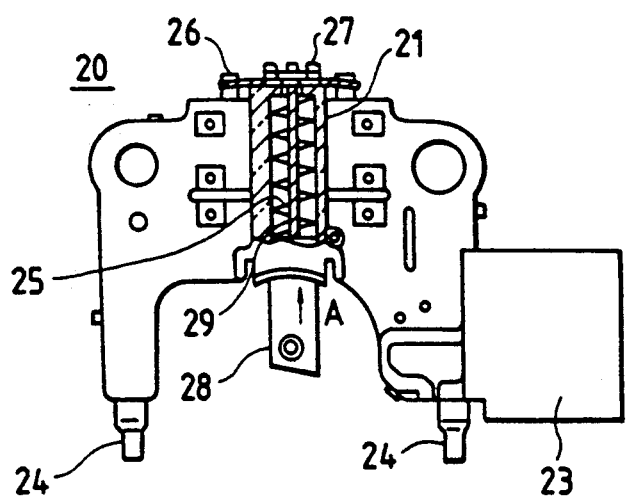

Further, as shown in FIG. 4, a guide cover 49 made of synthetic resin is provided so as to abut against the cover 48, and the guide cover 49 together with the brush holder 40 is fixed to the rear bracket 13 through mounting screws (not shown in the drawings) which are inserted into mounting holes 49a formed in the guide cover 49. According to this arrangement, it is possible to prevent the rubber cap 47 and the cover 48 of falling off from the brush box 41 because of vibration or the like as well as to prevent harmful substances such as salinity from entering the brush box 41.

According to the present invention, a connection lead of a brush is inserted into a compression spring and a tip end of the lead is welded to a metal terminal plate in advance, and, in this state, the brush is inserted into a brush box until the metal plate abuts against the upper end of the brush box, and then the metal terminal plate is soldered and connected to an electrode portion provided on the upper end of the brush box. Therefore, the brush can be easily assembled within the brush box without the need for special techniques. Further, the lead between the metal terminal plate and the brush is not shortened, and the length thereof can be accurately set at a desired predetermined value. Furthermore, replacement of the brush can be easily performed.

What is claimed is:

1. A brush holder provided in an AC generator adapted for use in vehicles, comprising:
    a brush unit adapted to be accommodated in a synthetic resin brush box including a brush, a lead having one end thereof connected to the brush, a metal terminal plate, another end of said lead being welded and connected to said metal terminal plate before said brush unit is accommodated in said brush box, and a compression spring interposed between the brush and said metal terminal plate;
    said brush box accommodating the brush unit therein being made of synthetic resin and having side walls and an open end portion; and
    a rigid electrode portion of a connection conductor, projecting from one of said side walls at a position proximate said open end portion of said brush box, said electrode portion being received in an opening formed in said metal terminal plate so as to position said brush unit at a predetermined position in said brush box, said electrode portion being soldered to said metal terminal plate so as to electrically connect said electrode portion and said brush unit when said brush unit is accommodated in said brush box, said terminal plate being abutted against said upper end portion of said brush box.

2. The brush holder according to claim 1, said brush unit further comprising a first hole formed in said metal terminal plate, through which said other end of said lead passes from a first side of said metal terminal plate to a second side thereof, and a projection formed on said second side of said metal terminal plate near said first hole, said other end of said lead being welded to said second side.

3. The brush holder according to claim 1, said brush unit further comprising a second hole formed in said metal terminal plate, through which said electrode portion passes from a first side of said metal terminal plate to a second side thereof when said metal terminal plate abuts against said upper end portion of said brush box.

4. The brush holder according to claim 1, further comprising:

means for sealing said brush box accommodating said brush unit therein.

5. A method for holding a brush within a brush holder provided in an AC generator adapted for use in vehicles, comprising the steps of:
(a) inserting a connection lead of a brush into an inside of a compression coil spring;
(b) welding a tip end of said connection lead onto a metal terminal plate;
(c) after steps (a) and (b), inserting said brush, along with said compression coil spring and said metal terminal plate, into an open end portion of a brush box made of synthetic resin until said metal terminal plate abuts against an upper end portion of said brush box; and
(d) soldering a rigid electrode portion, which projects from a side wall of said brush box at a position proximate said open end portion of said brush box through an opening formed in said metal terminal plate, onto said metal terminal plate, to thereby electrically connect said brush with said electrode portion and position said brush at a predetermined position within said brush box.

* * * * *